(12) United States Patent
Shen et al.

(10) Patent No.: US 9,495,442 B2
(45) Date of Patent: *Nov. 15, 2016

(54) SYSTEM AND METHOD FOR AUTOMATICALLY PUBLISHING DATA ITEMS ASSOCIATED WITH AN EVENT

(75) Inventors: Dan Shen, Shanghai (CN); Xiaodi Zhang, Palo Alto, CA (US); Qiang Wang, Shanghai (CN); Helen Hang Ye, San Jose, CA (US); JinYu Lou, Shanghai (CN)

(73) Assignee: eBay Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/440,865

(22) Filed: Apr. 5, 2012

(65) Prior Publication Data

US 2012/0197752 A1    Aug. 2, 2012

Related U.S. Application Data

(63) Continuation of application No. 12/604,265, filed on Oct. 22, 2009, now Pat. No. 8,176,032.

(51) Int. Cl.
*G06F 17/30* (2006.01)
*G06Q 30/06* (2012.01)

(52) U.S. Cl.
CPC ... *G06F 17/30643* (2013.01); *G06F 17/30663* (2013.01); *G06F 17/30713* (2013.01); *G06Q 30/0631* (2013.01)

(58) Field of Classification Search
CPC ................................................. G06F 17/30864
USPC .................................................. 707/769, 706
See application file for complete search history.

(56) References Cited

U.S. PATENT DOCUMENTS

| 7,428,522 | B1 * | 9/2008 | Raghunathan | ...... G06F 17/3087 |
| 7,672,937 | B2 * | 3/2010 | Madhavan et al. | ........... 707/752 |
| 7,895,193 | B2 * | 2/2011 | Cucerzan et al. | ............ 707/721 |
| 2008/0021860 | A1 * | 1/2008 | Wiegering et al. | ............... 707/1 |
| 2009/0030803 | A1 * | 1/2009 | Mohan | ........................... 705/26 |
| 2009/0106108 | A1 | 4/2009 | Ku | |
| 2009/0150214 | A1 * | 6/2009 | Mohan | ........................... 705/10 |
| 2009/0171869 | A1 | 7/2009 | Liu et al. | |
| 2010/0040220 | A1 * | 2/2010 | McGary et al. | ......... 379/265.09 |
| 2010/0088322 | A1 | 4/2010 | Chowdhury et al. | |
| 2010/0114882 | A1 * | 5/2010 | Wiegering et al. | ........... 707/728 |
| 2010/0161613 | A1 * | 6/2010 | Rao | ............................... 707/741 |
| 2010/0306235 | A1 | 12/2010 | Mishne | |
| 2011/0099201 | A1 | 4/2011 | Shen et al. | |

OTHER PUBLICATIONS

"U.S. Appl. No. 12/604,265, Non Final Office Action mailed Oct. 5, 2011", 11 pgs.
"U.S. Appl. No. 12/604,265, Notice of Allowance Mailed Jan. 9, 2012", 8 pgs.
"U.S. Appl. No. 12/604,265, Response Filed Nov. 30, 2011 to Non-Final Office action Received Oct. 5, 2011", 21 pgs.

* cited by examiner

*Primary Examiner* — Apu Mofiz
*Assistant Examiner* — Cindy Nguyen
(74) *Attorney, Agent, or Firm* — Schwegman, Lundberg & Woessner, P.A.

(57) ABSTRACT

Systems and methods are disclosed to automatically publish data items associated with a news event. In one embodiment, a method comprises determining, using one or more processors, an event of a plurality of events as associated with a heightened user interest, identifying one or more listings from a plurality of listings as matching the event associated with the heightened user interest, and presenting a visual representation of a relationship between the event and the one or more listings such that the one or more listings are displayed as visually related to the event.

20 Claims, 6 Drawing Sheets

SYSTEM AND METHOD FOR AUTOMATICALLY PUBLISHING DATA ITEMS ASSOCIATED WITH AN EVENT

RELATED APPLICATIONS

This application is a continuation of U.S. application Ser. No. 12/604,265, filed on Oct. 22, 2009, now issued as U.S. Pat. No. 8,176,032, which is incorporated herein by reference in its entirety.

BACKGROUND

Publication systems, such as online advertisers, online marketplaces, or other aggregator websites, deploy technology to selectively publish data items (e.g., online advertisements, marketplace listings, news items, etc.). These online publishers often selectively publish a subset of all the data items available to be published. A site administrator of an online publisher may decide which items to publish or suggest to a user.

BRIEF DESCRIPTION OF THE DRAWINGS

Some embodiments are illustrated by way of example and not limitation in the figures of the accompanying drawings in which.

DETAILED DESCRIPTION

Figure 1:
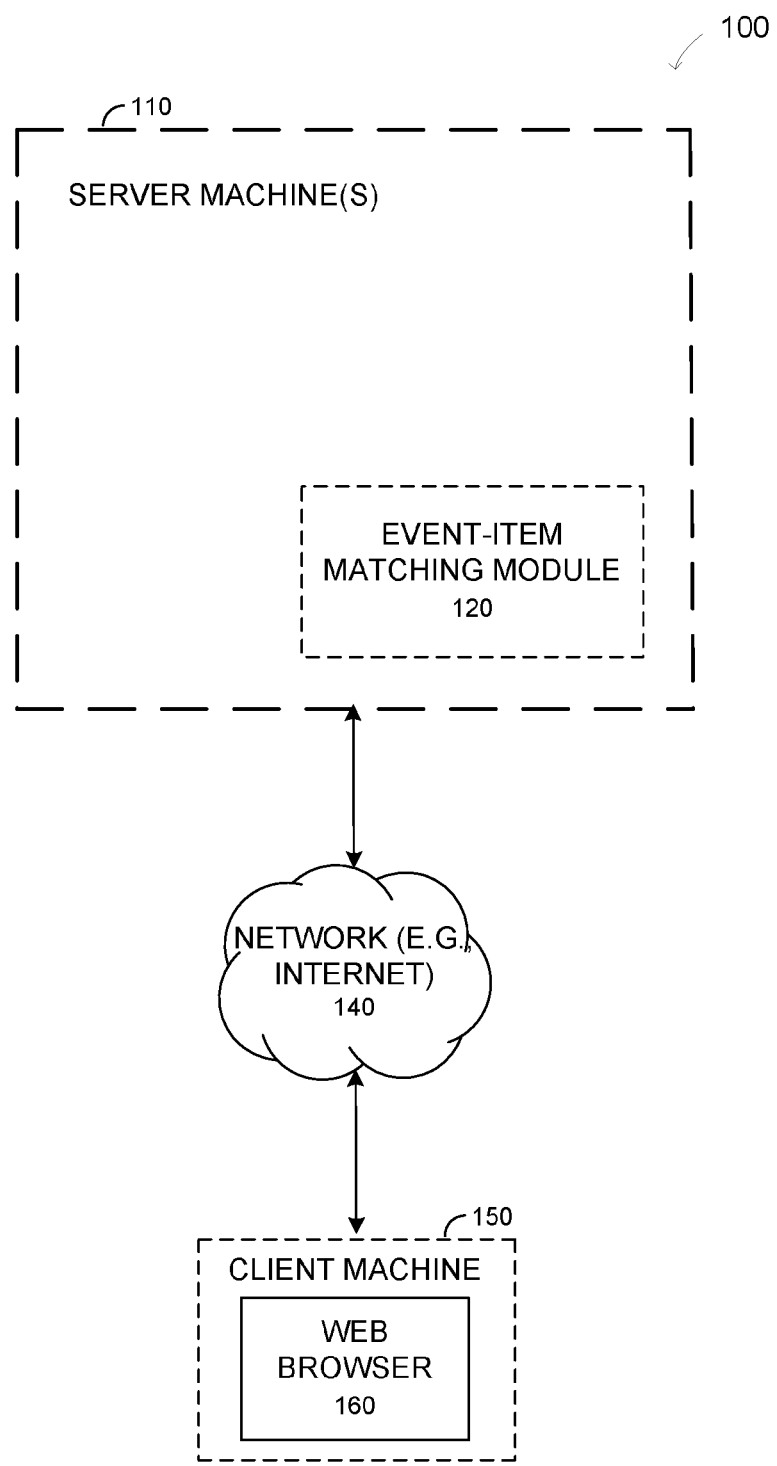
FIG. 1 is a block diagram illustrating a network environment within which an example system for automatically publishing data items associated with an event may be implemented.

Example methods and systems to provide items associated with events are described. In the following description, for purposes of explanation, numerous specific details are set forth in order to provide a thorough understanding of example embodiments. It will be evident, however, to one skilled in the art that the present invention may be practiced without these specific details.

According to one example embodiment, a system and method is discussed that can automatically publish data items associated with an event (e.g., an upcoming, ongoing, or just concluded event). For example, a system and method may automatically publish data items associated with an event on a webpage or other electronic document that is disseminated or accessible to the public. This may be done by monitoring, over time, search queries associated with search query categories. The search queries may include a number of search terms which may be related and associated with a search query category (or simply category). A search query category may be defined as a group of one or more related search terms. The search terms that are grouped together to form a search query category may all be related to a common concept, idea, or news event. Various information related to a search query category may be monitored and gathered, e.g., by monitoring search queries that include search terms associated with the search query category.

The frequency with which a search term or a group of terms is used in search queries directed to an on-line publishing system may indicate the level of users' interest with respect to certain items associated with these search terms. Often, the frequency of search queries (or search request frequency) associated with a search query category does not change dramatically over time. For example, the frequency with which users may search for a camera or pet supplies remains substantially unchanged. It has been observed, however, that once in a while, an on-line publishing system experiences a surge in search queries related to a particular category of search terms. These sudden changes in the frequency of certain search queries often correspond to a news-worthy event, such as, e.g., a release of a new movie, a sports event, upcoming presidential elections, etc. The sudden change in the frequency of search queries associated with a search query category may indicate heightened interest among users in a topic that may be related to an event. When a change in the frequency of search queries associated with a search query category is detected, it may be advantageous to preemptively display data items that may be produced by such search queries, using the displaying technologies associated with the on-line publishing system. In one embodiment, the preemptive display of data items related to search query category associated with the heightened interest among users indicated by the increased frequency of search requests may also include displaying the name of a news event that may have triggered the surge of the search queries. An event related to the search query category may be determined first, and any data items related to the event may be identified and displayed on a webpage together with the identification of the event. In one embodiment, events may be quickly determined and content or data items related to user interest may be published to allow access by users. Furthermore, in some embodiments, events that reflect heightened user interest may be more accurately determined than if determined manually by a site administrator. In another embodiment, the display of data items related to events may increase accessibility of a data item by a user. In an embodiment where the data item is an item listing on a network-based marketplace, the display of item listings related to events may result in improved product placement and, as a result, increase sales. In other embodiments where the data item is an advertisement to be published on a website, the display of the advertisement related to events may result in increased ad revenues as a result of increased user selection.

A data item, for the purposes of this description, will be understood as any unit of displayable digital content. For example, a data item may be a web link, an image, a file, a text item, or a combination of these. In one embodiment, a data item is an item listing on a network-based marketplace. The item listing may include one or more of the following: a link to an item page of an item for sale on the network-based marketplace, a description or textual information about the item for sale, a picture of the item for sale, an advertisement for the item for sale, an interface to purchase the item for sale, or any other information associated with the item for sale on a network-based marketplace. In other embodiments, a data item may include news listings on one or more news websites, music or video listings, stock listings, etc.

For the purposes of this description, an event may be defined as an occurrence that draws the common interest of a number of users or anything that is newsworthy. A sample list of events may include elections, wars or conflicts, debates, movie premiers, movie or show times, sporting events, conventions, celestial events, anniversaries of events, or other media events.

In order to present to users data items that are subject of a heightened interest and also present information related to the perceived cause of the heightened interest, an event-item matching system may be provided in conjunction with an on-line publishing system. In one example embodiment, the event-item matching system may be configured to monitor search queries directed to the on-line publishing system. The search queries may be identified as related to respective predetermined search query categories based on the search terms that are present in the search queries. Search query categories may be created by grouping search terms or keywords used in the search queries based on their similarity or relation to a common concept or topic to form a search query category. The monitoring of the search queries may reveal that the frequency of those search queries that include search terms from a certain search query category has increased above a predetermined threshold value. The event-item matching system may respond by determining a news event that corresponds to the topic or concept that unifies the terms grouped in the certain search query category. The event-item matching system may then identify, based on the search terms present in the search term category, data items that may be related to the news event. The determined data items (in the form of, e.g., item-listings, links, advertisements, etc.) may then be published together with the determined news event on a web page associated with the on-line publishing system.

In one embodiment, in order to determine that the frequency of those search queries that include search terms from a certain search query category has increased above a predetermined threshold value, the frequency of search queries is compared to a baseline frequency of search queries associated with the search query category. The baseline frequency of a search query category may be determined by calculating a value that reflects an average number of search queries associated with a search query category performed in a certain period of time or by some other metric. The length of monitored time frames or periods may be adjusted in order to detect short-term events (e.g., a lunar eclipse) or long term events (e.g., a tennis tournament or presidential elections campaign). For example, the time frame length may be a day, three days, a week, a month, etc. Multiple time frames of various time frame lengths may also be monitored such that short term events, which may require shorter time frames, and long term events, which may require larger time frames, can be monitored at the same time. The baseline frequency associated with a search query category may be compared with the current search query frequency for the category to determine whether there has been a change in search query frequency associated with the category. In some embodiments, the baseline frequency for a search query category may reflect an absolute frequency of search queries associated with the category for a selected period of time.

In one embodiment, a method comprises determining, using one or more processors, an event of a plurality of events as associated with a heightened user interest, identifying one or more listings from a plurality of listings as matching the event associated with the heightened user interest, and presenting a visual representation of a relationship between the event and the one or more listings such that the one or more listings are displayed as visually related to the event. Various embodiments are described below with respect to FIGS. 1-6.

An example system for automatically publishing data items associated with an event may be implemented in the context of a network environment, as shown in FIG. 1. FIG. 1 illustrates a network environment 100, within which an example system for automatically publishing data items associated with an event may be implemented. The environment 100 may include one or more server machines 110 connected through a network (e.g., the internet) 140 to one or more client machines 150. The server machines 110 may comprise an event-item matching module 120 and one or more publishing platforms such as a network-based trading platform. In one embodiment, the network-based trading platform may provide one or more marketplace applications, payment applications, and other resources. The marketplace applications may provide a number of marketplace functions and services to users that access the marketplace. The payment applications, likewise, may provide a number of payment services and functions to users. The network-based trading platform may display various items listed on the trading platform.

The embodiments discussed in this specification are not limited to network-based trading platforms however. In other embodiments, other publishing platforms, such as a social networking websites, news aggregating websites, web portals, network-based advertising platforms, or any other system that display items to users, may be used. Furthermore, more than one platform may be supported by each event-item matching module 120 and each platform may reside on a separate server machine 110 from the event-item matching module 120.

The client machine 150 may host a web client or a web browser 160. The client machine 150 may be configured to permit a user to access the various applications, resources, and capabilities of the publishing platform via a web browser 160. While FIG. 1 illustrates the client machine 150 and the server machine 110 in a client-server architecture, other embodiments are not limited to this architecture, and may equally find applications in a distributed, peer-to-peer, or standalone architectures. An example event-item matching module may be discussed with reference to FIG. 2.

Figure 2:
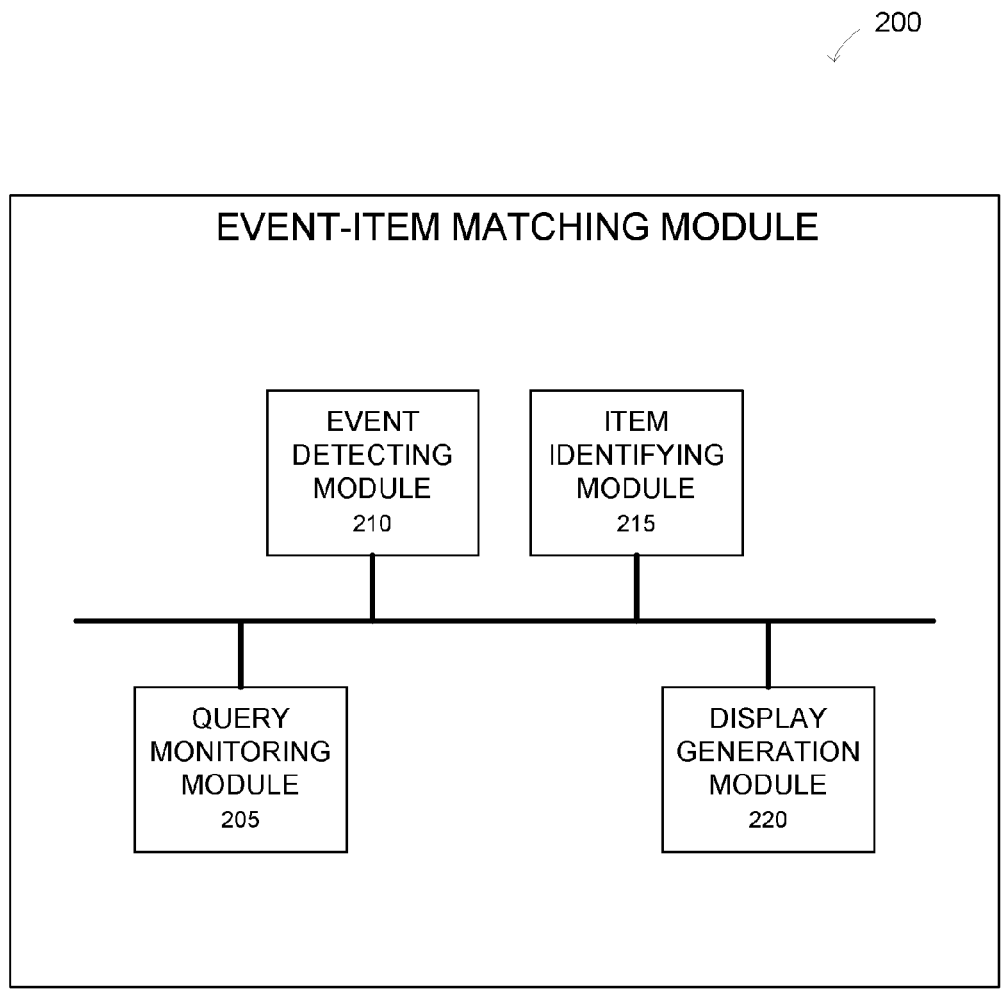
FIG. 2 is a block diagram illustrating an event-item matching module in accordance with one example embodiment.

FIG. 2 is a block diagram illustrating an event-item matching module 200 in accordance with one example embodiment. The event-item matching module 200 comprises a query monitoring module 205, an event detecting module 210, an item identifying module 215, and a display generation module 220.

A query monitoring module 205 may be configured to monitor query activities, such as search queries that use one or more search terms or keywords, of a number of users of a publishing platform. In other embodiments, the query monitoring module 205 may monitor query activities of a number of users across multiple publishing platforms over time. For example, users' search queries on a marketplace platform, an online search engine, and a news aggregator service may all be monitored by the same query monitoring module 205. Search terms or keywords used in the search queries may be tracked in a memory of the query monitoring module 205 or recorded in a database of the query monitoring module 205. The query monitoring module 205 may also group together, combine or merge related search terms or keywords used in the search queries based on their similarity and associate them with one or more search query categories. The tracking of search terms used in search queries may be performed in real time as each search query is processed or in one or more batch jobs using the information stored in the memory or database of the query monitoring module 205.

The query monitoring module 205 may monitor search queries to determine baseline frequencies for each of the search query categories. For example, the frequency of search queries associated with a search query category may be tracked and recorded in a memory for one or more baseline time frames (e.g., the past 7 days, the past month, the past year, the past three years, every year for the past five years) and a baseline frequency for the search query category may be determined based on the frequency of search queries for one or more of these baseline time frames. For the purpose of illustration, some example baseline frequencies associated with a search query category may be 20 searches per day based on there being an average of 20 searches per day for the last thirty days, 7 searches per hour based on there being an average of 7 searches per hour based on a sampling of 20 randomly selected hours, 40 searches per week based on there being 40 searches in the previous week, etc.

The query monitoring module 205 may also monitor the search queries to detect a change in search request frequency associated with a search query category. For example, the frequency of search queries associated with a search query category can suddenly increase above a baseline frequency or decrease below the baseline frequency over a certain time frame or period. The length of the time frames used to monitor a change in frequency of search queries associated with a search query category may be adjusted in order to detect short term events or long term events. For example, the time frame length used to monitor a change in frequency of search queries associated with a search query may be a day, three days, a week, a month, etc. Multiple time frames of various time frame lengths may also be monitored such that short term events, which may require shorter time frames, and long term events, which may require larger time frames, can be monitored at the same time.

One or more search query categories may also be identified by the query monitoring module 205 as reflecting users heightened interest in an event based on the interest level among multiple users. For example, the frequency of search queries associated with one or more search query categories may surge in a certain period of time. The surge in frequency of search queries associated with one or more search query categories may indicate heightened interest in one or more events associated with the one or more search query categories. These search query categories may be identified as associated with increased search intensity so that data items associated with the events corresponding to the identified search query categories may be displayed.

In one embodiment, users' interest levels may be measured based on the change in search request frequency associated with a search query category. For example, the query monitoring module 205 may rank search query categories based on the amount or degree of change in the frequency of search queries associated with each search query category. The search query categories with the greatest increase in search request frequency for a given time frame may be identified as associated with increased search intensity. In another embodiment, one or more search query categories may be identified as associated with increased search intensity based on the absolute search frequency over a given time frame, i.e., the number of times a search query associated with each of the search query categories is issued during that time frame.

An event detecting module 210 may determine an event that potentially triggered an increase in the frequency of search queries associated with a search query category. An event detecting module 210 may be configured to interrogate an event database with search terms from a search query category to identify a related news event. An event database may be located on one or more of the server machines 110 of the publishing platform, in the event detecting module 210, or at a remote location. In one embodiment, the event detecting module 210 may automatically populate the event database with records storing event information, e.g., by interacting with a calendaring system, a news provider system, or a news/event search tool. Alternatively, or in addition, the event database may be populated manually.

In another embodiment, the event detecting module 210 may determine an event associated with a search query category identified by the query monitoring module 205 as associated with increased search intensity by querying a database maintained by one or more third-party providers of event information with information relating to the one or more identified search query categories. One example of a third-party provider of event information is a news service provider or aggregator that can be queried with information relating to an identified search query. In some embodiments, the news service provider may have an application programming interface (API) that the event detecting module 210 may use to request its services. The information relating to an identified search query category may include key words or search terms used in the search query, metadata relating to the search query category, or any other information about the search query category that can be used to query the third-party event provider.

An item identifying module 215 may be configured to identify data items related to one or more search query categories. In one embodiment, data items related to an event determined by the event detecting module 210 are identified by the item identifying module 215. The item identifying module 215 may be configured to determine data items by querying a data item database. A data item database may be located in the item identifying module 215, on one or more of the server machines 110 of the publishing platform, or at a remote location. For example, a network marketplace platform may have one or more server machines that enable an item identifying module 215 to determine data items related to an event or search query category. Data item databases may be automatically populated with data items by interacting with an inventory system or an information gathering system.

In another embodiment, the item identifying module 215 may be configured to determine the data items associated with an event by querying a third-party data item search tool. Information relating to an event or a search query category may be used in these queries. A third-party data item search tool may be provided as part of a third party merchandizing platform, a marketplace platform, a news service aggregator, or any other third party system that can determine data items related to a search query category or event. These third party systems may provide an Application Programming Interface (API) that the item identifying module 215 may use to requests its services.

A display generation module 220 may be configured to publish data items associated with an event or search query category. In one embodiment, the display generation module facilitates the display of one or more data items and information associated with the event. For example, the display generation module 220 may create a web page viewable by a user when displayed by a web browser and transmit the page to a user's web browser via a network or store the page in memory for future transmission. In another embodiment, information associated with data items related to an event, search queries, or events may be stored in a database or sent to other systems for further processing. Information associated with the event or data items may also be displayed or stored by the display generation module 220. For example, the data items (e.g., in the form of item-listings, links, advertisements, etc.) may be displayed in a way that indicates their relationship to the event along with information about the event or information such as event history or background and item summaries or reviews.

Figure 3:
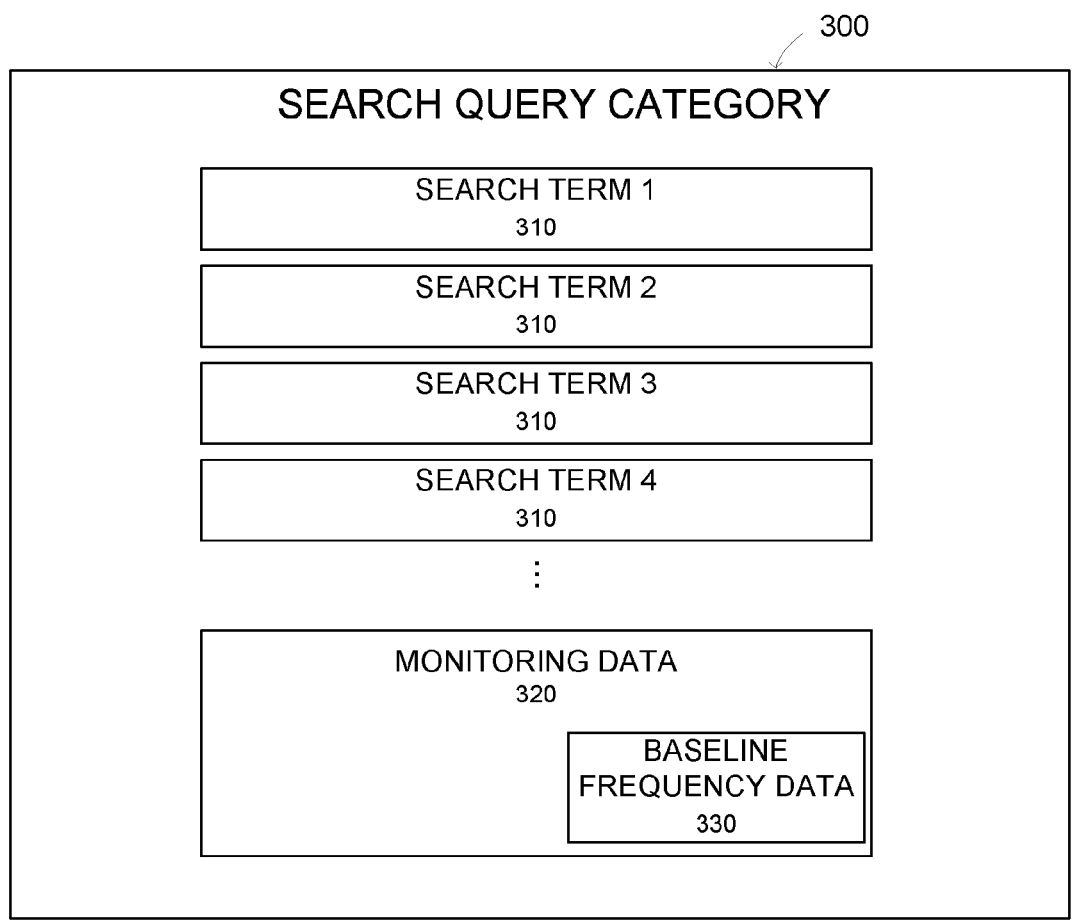
FIG. 3 is a block diagram illustrating a data structure of a search query category in accordance with one example embodiment.

FIG. 3 is a block diagram illustrating a data structure of a search query category 300 in accordance with one example embodiment. In this embodiment, the data structure of the search query category 300 comprises one or more search terms 310, or indicator of the search terms, associated with the search query category. The data structure 300 may also include monitoring data 320 used to monitor search queries associated with the search query category, detect a change in a search request frequency associated with the search query category, or any other operation related to the search query category. Monitoring data 320 may be used to determine one or more baseline frequencies associated with the search query category. For example, monitoring data 320 may include a log of search queries associated with a search query category and an associated timestamp for each query or records of how many search queries associated with a search query category were requested by users in one or more time frames that may be updated periodically. The baseline frequency data 330 may include these baseline frequencies associated with the search query category. In other embodiments, the search query category data structure 330 may also include event information or indicators for events associated with the search query category and data item information or indicators for associated data items.

Figure 4:
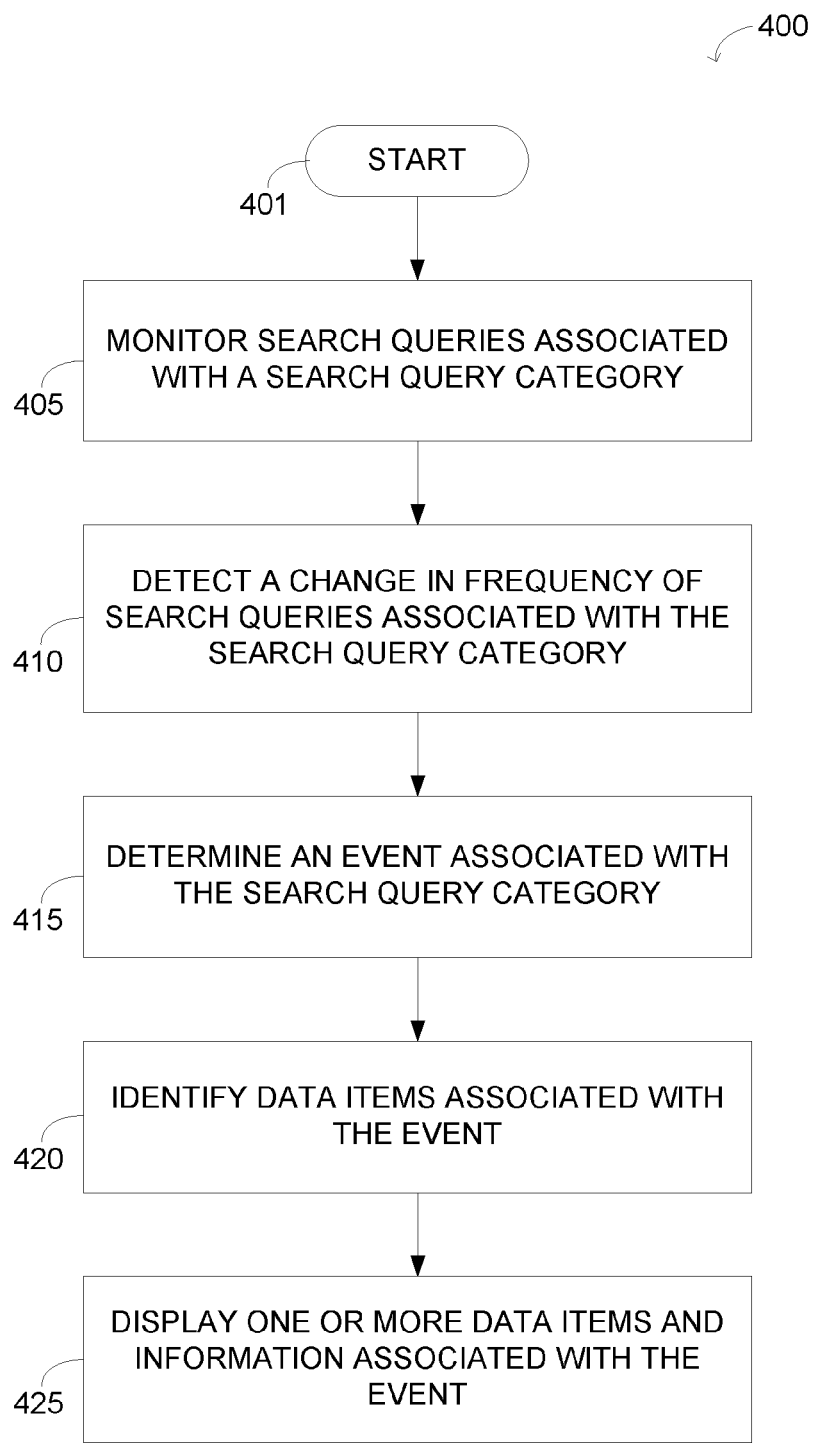
FIG. 4 is a flow diagram illustrating a method for automatically publishing data items associated with an event, in accordance with one example embodiment.

FIG. 4 is a flow diagram illustrating a method 400 for automatically publishing data items associated with an event, in accordance with one example embodiment. The method commences at operation 401 and proceeds to operation 405, where a query monitoring module 205 of FIG. 2 monitors search queries associated with a search query category. For example, the query monitoring module may monitor search queries that include search terms associated with a search query category. A query monitoring module may associate search terms a user uses with a search query category and other similar or related search terms that may or may not already be associated with the search query category may be grouped together to be associated with the search query category.

The query monitoring module 205 may monitor the frequency of search queries associated with a search query category to determine a baseline frequency for the search query category. In one embodiment, the query monitoring module 205 monitors the frequency of search queries using search terms associated with the search query category to determine a baseline frequency for the search query category. The baseline frequency for the search query category may be determined based on the average frequency per unit of time for a searches associated with a given search query category for a certain baseline period (for example, the average number of searches associated with a certain search query per hour for the last week, the average number of searches per day for the last month, etc.) or the baseline frequency may simply be the number of searches associated with a certain search query for a certain period (for example, the number of searches in the seven day period beginning fourteen days ago).

At operation 410, the query monitoring module 205 detects a change in the frequency of search queries associated with the search query category. In one embodiment, detecting a change in frequency of search queries associated with the search query category involves monitoring the search request frequency of search queries using search terms associated with a search query category for a certain time frame and comparing the frequency of search queries for that time frame with the baseline time frame associated with that search query category. For example, the frequency of search queries associated with the search query category over the most recent seven day period may be compared with the seven-day baseline frequency for the search query category.

In another embodiment, the query monitoring module 205 may also be configured to generate a score value for one or more search query categories based on the change in the frequency of search queries using the search terms associated with the search query categories. Scoring may also be based on other factors in addition to the change in the frequency of search queries using search terms associated with the search query categories. In one example embodiment, search queries may be scored based on the absolute frequency of search terms associated with the search queries. The query monitoring module 205 may also assign the score values to each of the search query categories and rank them according to their scores. After being scored and ranked, the query monitoring module 205 may identify, based on the score and rank, one or more search query categories as reflecting users' heightened interest in a subject.

At operation 415, the event detecting module 210 determines an event associated with the search query category. In one embodiment, only an event related to an identified search query category is determined, while in other embodiment an event related to each of the monitored search query categories is determined. The event detecting module 210 may determine an event associated with a search query category by querying a third-party event provider, such as a news aggregator service with information associated with a search query category. In some instances, the process of querying may be configured to conform to an API provided by the third-party event provider.

An event may also be determined by querying an event database based on a search query category to determine events related to the search query category. The event database may be located in the event detecting module 210 itself, on one or more of the server machines 110 of the publishing platform, or at a remote location. As described above, the event database may be automatically populated with events by interacting with a calendaring system, a news provider system, or a news/event search tool. In response to the querying, the event database returns to the event detection module 210 an identification of an event associated with the search query category.

At operation 420, the item identifying module 215 identifies data items associated with the event. The item identifying module 215 may determine data items by using a data item search tool or querying an item database based on the search query category. The item database may be located in the item identifying module 215, on one or more of the server machines 110 of the publishing platform, or at a remote location. For example, a network marketplace platform may have one or more server machines that enable the item identifying module 215 to determine data items in the form of item listings related to an event or search query category.

At operation 425, the display generation module 220 facilitates the display of one or more data items and information associated with the event to a user. In one embodiment, the display generation module 220 generates a visual representation of a relationship between the one or more data items and the event. In another embodiment, the display generation module 220 creates a web page wherein, when displayed, the one or more data items represented on the web page appear visually related to the event. The display generation module 220 may also transmit the web page to a user via a network. In other embodiments, the display generation module 220 transmits information associated with the event and data items to another system, wherein the receiving system is to further facilitate the display of the one or more data items and information associated with the event to a user.

Figure 5:
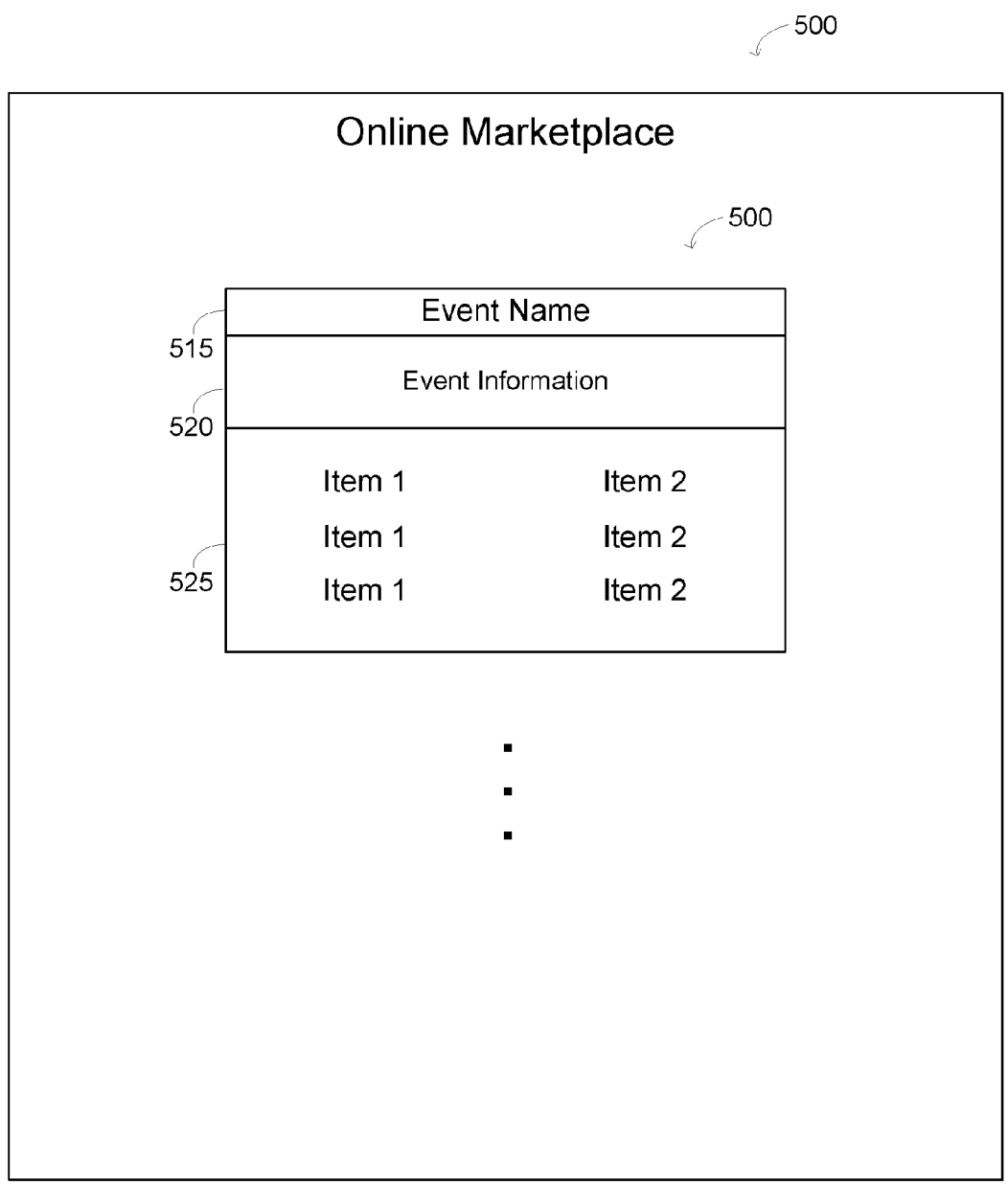
FIG. 5 is a user interface illustrating a web page layout in which items related to an event are displayed, in accordance with one example embodiment.

FIG. 5 is a user interface 500 illustrating a web page layout in which items related to an event are displayed, in accordance with one example embodiment. In the user interface 500 shown in FIG. 5, the event name 515 of an event, event information 520 about the event, and multiple data items related to the event are shown to be close in proximity and organized with borders and dividers to visually show that they are related. In an example where an online marketplace platform uses this web page layout, the data items related to the event may be item listings or advertisements for products or services offered for sale at the online marketplace platform.

Figure 6:
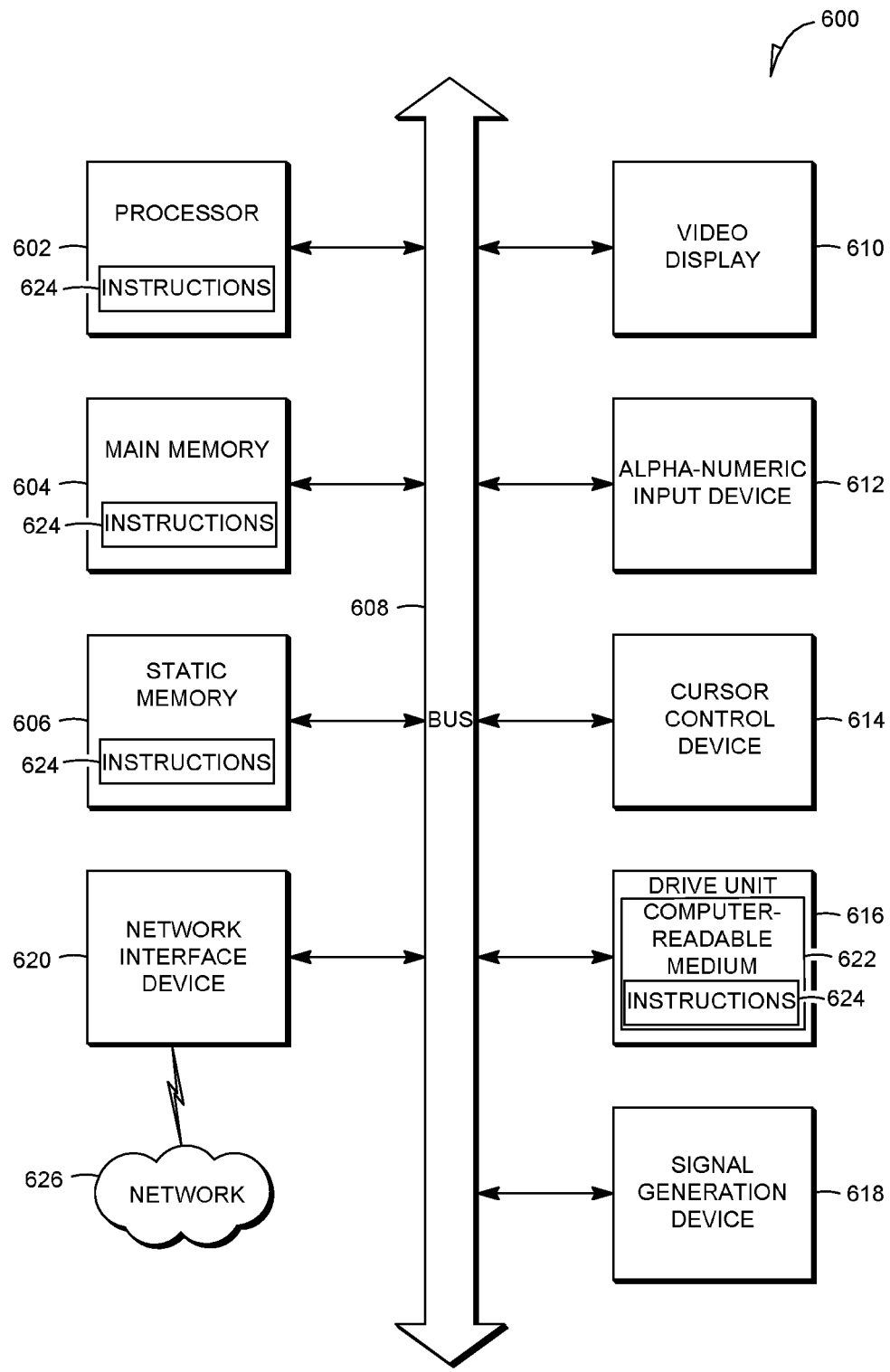
FIG. 6 is a diagrammatic representation of a machine in the example form of a computer system, according to various embodiments.

FIG. 6 is a diagrammatic representation of a machine in the example form of a computer system 600, according to various embodiments within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a server computer, a client computer, a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 600 includes a processor 602 (e.g., a central processing unit (CPU) a graphics processing unit (GPU) or both), a main memory 604 and a static memory 606, which communicate with each other via a bus 608. The computer system 600 may further include a video display unit 610 (e.g., a liquid crystal display (LCD) or a cathode ray tube (CRT)). The computer system 600 also includes an alphanumeric input device 612 (e.g., a keyboard), a cursor control device 614 (e.g., a mouse), a disk drive unit 616, a signal generation device 618 (e.g., a speaker) and a network interface device 620.

The disk drive unit 616 includes a machine-readable medium 622 on which is stored one or more sets of instructions 624 (e.g., software) embodying any one or more of the methodologies or functions described herein. The software 624 may also reside, completely or at least partially, within the main memory 604 and/or within the processor 602 during execution thereof by the computer system 600, the main memory 604 and the processor 602 also constituting machine-readable media. The software 624 may further be transmitted or received over a network 626 via the network interface device 620.

While the machine-readable medium 622 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention. The term "machine-readable medium" shall accordingly be taken to include, but not be limited to, solid-state memories, optical media, and magnetic media.

Thus, method and system for automatically publishing data items associated with an event were described. Although the present invention has been described with reference to specific example embodiments, it will be evident that various modifications and changes may be made to these embodiments without departing from the broader spirit and scope of the invention. The various modules discussed may be implemented in hardware, software, or a combination of these. Accordingly, the specification and drawings are to be regarded in an illustrative rather than a restrictive sense.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A method comprising:
creating a search query category data structure, the search query category data structure containing a plurality of different search queries, each different search query in the search query category data structure corresponding to a single search query category, the search query category data structure further containing monitoring data comprising baseline frequency information including a log of past searches for the plurality of different search queries in the search query category data structure, the log of past searches indicating a frequency of search for each of the plurality of different search queries in the search query category data structure, the frequencies indicating a baseline user interest in the search query category;
receiving a search query from a user;

performing a search using the search query, the search resulting in a plurality of search results;

determining that the search query from the user matches a search query in the plurality of different search queries in the search query category data structure;

determining, using one or more processors, a news event of a plurality of news events, the news event corresponding to a recent increase in user interest above a baseline user interest for search queries, other than the search query from the user, in the search query category data structure, based on the monitoring data;

storing an identification of the news event in an event database;

identifying a subset of the search results as containing one or more listings that match the news event associated with the user interest by comparing keywords in each of the search results to news event identifications in the news event database; and presenting, to the user, a visual representation of a relationship between the news event and the one or more listings such that the one or more listings are displayed as visually related to the news event.

2. The method of claim 1, wherein the recent increase in user interest is measured based on a number of search requests for the news event within a predetermined period of time.

3. The method of claim 1, wherein the recent increase in user interest is measured based on an indication of a change in a search request frequency associated with one or more search queries.

4. The method of claim 3, wherein the change in the search request frequency is identified based on monitoring search query requests over a specified period of time.

5. The method of claim 1, wherein at least one listing of the one or more listings corresponds to an item for sale.

6. The method of claim 5, wherein the at least one listing comprises one or more item listings received from a network-based marketplace.

7. The method of claim 1, wherein at least one listing of the one or more listings corresponds to news.

8. The method of claim 7, wherein the at least one listing comprises one or more news listings received from a news service provider.

9. The method of claim 1, wherein at least one listing of the one or more listings corresponds to at least one of multimedia content or stock.

10. The method of claim 1, wherein the news event comprises a first news event and a second news event, wherein the presenting comprises displaying a first subset of the one or more listings in relation with the first news event and displaying a second subset of the one or more listings in relation with the second news event.

11. The method of claim 1, wherein at least one listing of the one or more listings corresponds to an item, wherein the presenting comprises displaying at least one of a link to an item page of the item, a description about the item, a picture of the item, an advertisement for the item, an interface to purchase the item or any other information associated with the item.

12. The method of claim 1, wherein the presenting comprises displaying a name of the news event and additional information associated with the news event.

13. A system comprising:
a memory to store a plurality of listings;
an event database; and
one or more processors to execute an event-listing matching module, the event-listing matching module configured to:
create a search query category data structure, the search query category data structure containing a plurality of different search queries, each different search query in the search query category data structure corresponding to a single search query category, the search query category data structure further containing monitoring data comprising baseline frequency information including a log of past searches for the plurality of different search queries in the search query category data structure, the log of past searches indicating a frequency of search for each of the plurality of different search queries in the search query category data structure, the frequencies indicating a baseline user interest in the search query category;

receive a search query from a user;

perform a search using the search query, the search resulting in a plurality of search results;

determine that the search query from the user matches a search query in the plurality of different search queries in the search query category data structure;

determine a news event of a plurality of events, the news event corresponding to a recent increase in user interest above a baseline user interest for search queries, other than the search query from the user, in the search query category data structure, based on the monitoring data;

store an identification of the news event in the event database;

identify a subset of the search results as containing one or more listings that match the news event associated with the user interest by comparing keywords in each of the search results to news event identifications in the news event database; and present, to the user, a visual representation of a relationship between the news event and the one or more listings such that the one or more listings are displayed as visually related to the news event.

14. The system of claim 13, wherein the event-listing matching module is configured to:
query a third party event provider to determine the news event associated with the user interest.

15. The system of claim 14, the third party event provider comprises a news service provider.

16. The system of claim 13, wherein the event-listing matching module is configured to:
compare a first search request frequency associated with the news event with a second search request frequency associated with the event to identify a change in the search request frequency.

17. The system of claim 16, wherein the first search request frequency comprises a baseline frequency reflecting an average number of search queries detected during a first time interval and wherein the second search request frequency comprises an absolute frequency reflecting an actual number of search queries detected during a second time interval.

18. The system of claim 16, wherein the first search request frequency is associated with a first set of search queries and the second search request frequency is associated with a second set of search queries, wherein the first and second sets of queries are associated with a same search category.

19. The system of claim 13, wherein the news event comprises a first news event and a second news event, wherein the event-listing matching module is configured to:
   display a first subset of the one or more listings in relation with the first news event and display a second subset of the one or more listings in relation with the second news event.

20. A non-transitory computer-readable storage device storing instructions which, when executed by one or more processors, cause the one or more processors to perform operations comprising:
   creating a search query category data structure, the search query category data structure containing a plurality of different search queries, each different search query in the search query category data structure corresponding to a single search query category, the search query category data structure further containing monitoring data comprising baseline frequency information including a log of past searches for the plurality of different search queries in the search query category data structure, the log of past searches indicating a frequency of search for each of the plurality of different search queries in the search query category data structure, the frequencies indicating a baseline user interest in the search query category;
   receiving a search query from a user;
   performing a search using the search query, the search resulting in a plurality of search results;
   determining that the search query from the user matches a search query in the plurality of different search queries in the search query category data structure;
   determining, using one or more processors, a news event of a plurality of news events, the news event corresponding to a recent increase in user interest above a baseline user interest for search queries, other than the search query from the user, in the search query category data structure, based on the monitoring data;
   storing an identification of the news event in an event database;
   identifying a subset of the search results as containing one or more listings that match the news event associated with the user interest by comparing keywords in each of the search results to news event identifications in the news event database; and
   presenting, to the user, a visual representation of a relationship between the news event and the one or more listings such that the one or more listings are displayed as visually related to the news event.

\* \* \* \* \*